United States Patent
Tomkins et al.

(10) Patent No.: US 10,756,976 B2
(45) Date of Patent: Aug. 25, 2020

(54) DATA NETWORK AND EXECUTION ENVIRONMENT REPLICATION FOR NETWORK AUTOMATION AND NETWORK APPLICATIONS

(71) Applicant: Ciena Corporation, Hanover, MD (US)

(72) Inventors: Robert Kevin Tomkins, Ottawa (CA); Romualdas Armolavicius, Stittsville (CA)

(73) Assignee: Ciena Corporation, Hanover, MD (US)

( * ) Notice: Subject to any disclaimer, the term of this patent is extended or adjusted under 35 U.S.C. 154(b) by 107 days.

(21) Appl. No.: 16/106,661

(22) Filed: Aug. 21, 2018

(65) Prior Publication Data

US 2020/0067772 A1 Feb. 27, 2020

(51) Int. Cl.
*H04L 12/24* (2006.01)
*G06F 9/54* (2006.01)

(52) U.S. Cl.
CPC ........ *H04L 41/0823* (2013.01); *H04L 41/085* (2013.01); *H04L 41/0846* (2013.01); *H04L 41/12* (2013.01); *H04L 41/14* (2013.01); *H04L 41/145* (2013.01); *H04L 41/147* (2013.01); *H04L 41/5038* (2013.01); *G06F 9/547* (2013.01)

(58) Field of Classification Search
CPC ...... H04L 41/145; H04L 41/14; H04L 41/147
See application file for complete search history.

(56) References Cited

U.S. PATENT DOCUMENTS

| | | | |
|---|---|---|---|
| 6,807,523 B1 * | 10/2004 | Wensink | H04J 14/0227 703/14 |
| 8,683,028 B2 | 3/2014 | Davison et al. | |
| 8,775,152 B2 | 7/2014 | Carroll et al. | |
| 9,183,121 B2 * | 11/2015 | Pruss | H04L 43/50 |
| 9,432,254 B1 * | 8/2016 | Naqvi | H04L 41/084 |
| 10,015,057 B2 | 7/2018 | Djukic et al. | |
| 10,303,679 B2 * | 5/2019 | Lee | G06F 11/2097 |
| 10,521,317 B1 * | 12/2019 | Ippatapu | H04L 67/1095 |
| 2008/0270596 A1 * | 10/2008 | Wahl | H04L 67/1095 709/224 |
| 2010/0077063 A1 * | 3/2010 | Amit | H04L 12/12 709/221 |

(Continued)

*Primary Examiner* — Lashonda T Jacobs
(74) *Attorney, Agent, or Firm* — Clements Bernard Walker; Lawrence A. Baratta, Jr.; Christopher L. Bernard (57) ABSTRACT

Network replica systems and methods include, via a server, a group of servers, or in a cloud computing environment, communicating with one or more management systems and one or more networks associated with the one or more management systems via one or more Application Programming Interfaces (APIs); obtaining data from the one or more management systems and/or the one or more networks; storing the data in a database of record which defines a detailed model of a current state of the networks; and applying one or more assertions to data of interest in the database of record to emulate behavior in the one or more networks, wherein the assertions map actual device, process, business, architecture, and technology behaviors onto the data of interest from the database of record to emulate the behavior, wherein the database of record and the applied one or more assertions include a network replica of the networks.

20 Claims, 7 Drawing Sheets

(56) References Cited

U.S. PATENT DOCUMENTS

| | | | |
|---|---|---|---|
| 2013/0297769 A1* | 11/2013 | Chang | G06F 9/445 |
| | | | 709/224 |
| 2014/0026123 A1* | 1/2014 | Dhanapal | H04L 41/0686 |
| | | | 717/124 |
| 2014/0046645 A1* | 2/2014 | White | H04L 41/145 |
| | | | 703/13 |
| 2014/0337674 A1* | 11/2014 | Ivancic | H04L 43/50 |
| | | | 714/43 |
| 2016/0112327 A1 | 4/2016 | Morris et al. | |
| 2016/0182329 A1 | 6/2016 | Armolavicius et al. | |
| 2016/0254964 A1* | 9/2016 | Benc | H04L 41/0853 |
| | | | 709/223 |
| 2016/0330083 A1 | 11/2016 | Djukic et al. | |
| 2017/0083643 A1* | 3/2017 | Seigel | H04L 63/10 |
| 2017/0131980 A1* | 5/2017 | Velandy | H04L 41/0233 |
| 2017/0214467 A1 | 7/2017 | Djukic et al. | |
| 2017/0230267 A1 | 8/2017 | Armolavicius et al. | |
| 2017/0257263 A1* | 9/2017 | Bortnikov | G06F 16/184 |
| 2018/0115466 A1* | 4/2018 | Kazemian | H04L 41/147 |
| 2018/0131580 A1 | 5/2018 | Tomkins et al. | |
| 2020/0012505 A1* | 1/2020 | Shil | G06F 9/45558 |

* cited by examiner

DATA NETWORK AND EXECUTION ENVIRONMENT REPLICATION FOR NETWORK AUTOMATION AND NETWORK APPLICATIONS

FIELD OF THE DISCLOSURE

The present disclosure generally relates to data communications networking. More particularly, the present disclosure relates to systems and methods for data network and execution environment replication for network automation and network applications such as A/B testing, optimization, simulation, planning, and the like.

BACKGROUND OF THE DISCLOSURE

Network Automation has been linked to enabling and enabled by Software Defined Networking (SDN), Network Functions Virtualization (NFV), and management solutions. In the case of SDN, one or more controllers and/or orchestration systems attempts to program network configuration and routing directly into network devices based on policy or information from a northbound interface. NFV focuses on placing virtualized network functions on physical network, compute, and storage resources to create more appropriate service chains for the aggregate set of services currently active on the network with the appropriate connectivity through the network. Network management focuses on the collection of data from the network in a database of record from an operational perspective which can be used for planning, but is not designed to create a network replica, not able to emulate a network for functions like A/B testing, nor is it typically designed to be resident in fully distributed edge or cloud compute infrastructure.

Digital twinning is used in the industrial sector to model processes for the purposes of asset optimization and emulation but has not been extended to communications networking including logical and physical network constructs and functions. There are no current solutions that can provide a network representation that replicates a network and its environment in near real-time including virtual, logical, physical devices, and resources with the ability to emulate the network, its environment, and processes for applications such as AB testing, optimization, simulation, planning, and the like.

BRIEF SUMMARY OF THE DISCLOSURE

In an embodiment, a network replica method includes, via a server, a group of servers, or in a cloud computing environment, communicating with one or more management systems and one or more networks associated with the one or more management systems via one or more Application Programming Interfaces (APIs); obtaining data from the one or more management systems and/or the one or more networks; storing the data in a database of record which defines a detailed model of a current state of the one or more networks; and applying one or more assertions to data of interest in the database of record to emulate behavior in the one or more networks, wherein the assertions map actual device, process, business, architecture, and technology behaviors onto the data of interest from the database of record to emulate the behavior, wherein the database of record and the applied one or more assertions include a network replica of the one or more networks. The one or more assertions can model functional capabilities and limitations of components in the one or more networks. The network replica method can further include normalizing the obtained data to a common normalized definition and timeframe prior to the storing.

The one or management systems can include any of a hypervisor, a Network Functions Virtualization Orchestrator (NFVO), a Multi-Domain Service Orchestrator (MDSO), a Software Defined Networking (SDN) controller, an Element Management System (EMS), a Network Management System (NMS), an Operation Support System (OSS), and a Business Support System (BSS). The network replica method can further include analyzing the stored data via an analytics engine to detect whether the one or more networks are in an anomalous state and, if so, to identify a degree of distress based on past network states from the database of record. The network replica method can further include segmenting the network replica into subcomponents; and distributing the subcomponents of the network replica to edge and core cloud compute components for analyzing local equipment. The one or more assertions can emulate traffic on the one or more networks at any of a photonic layer, a Time Division Multiplexing (TDM) layer, a packet layer, and a combination thereof. The network replica method can further include analyzing the obtained data to determine relevance of the obtained data prior to the storing.

In another embodiment, a system includes one or more network interfaces communicatively coupled to one or more management systems and one or more networks associated with the one or more management systems via one or more Application Programming Interfaces (APIs); one or more processors communicatively coupled to the one or more network interfaces; and memory storing instructions that, when executed, cause the one or more processors to obtain data from the one or more management systems and/or the one or more networks, store the data in a database of record which defines a detailed model of a current state of the one or more networks, and apply one or more assertions to data of interest in the database of record to emulate behavior in the one or more networks, wherein the assertions map actual device, process, business, architecture, and technology behaviors onto the data of interest from the database of record to emulate the behavior, wherein the database of record and the applied one or more assertions include a network replica of the one or more networks.

In a further embodiment, a non-transitory computer-readable medium including instructions that, when executed, cause a server, group of servers, or a cloud computing environment to perform the steps of: communicating with one or more management systems and one or more networks associated with the one or more management systems via one or more Application Programming Interfaces (APIs); obtaining data from the one or more management systems and/or the one or more networks; storing the data in a database of record which defines a detailed model of a current state of the one or more networks; and applying one or more assertions to data of interest in the database of record to emulate behavior in the one or more networks, wherein the assertions map actual device, process, business, architecture, and technology behaviors onto the data of interest from the database of record to emulate the behavior, wherein the database of record and the applied one or more assertions include a network replica of the one or more networks.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for logical network and environment replication for network automation and applications such as A/B testing, optimization, simulation, planning, and the like. For network automation, the systems and methods include a logical database of record that interacts with all services, network managed entities, applications, functions, and storage, compute, physical, and human resources (or some subset) and their associated data of relevance in real-time (each will be referred to as a managed entity for the remainder of this document). The real-time database of record is sufficiently complete for network automation. The network behavior can be emulated to a degree required by applications that automate the network via assertions that map actual device, process, business, architecture, technology behaviors onto the database of record.

The database of record is a logical replica of not just the physical network, but a complete implementation includes its full configuration environment to provide optimization, AB testing, planning, prediction, attack, and change management. The database of record is logical replica capable of interpreting virtual, physical, and human resources including their limitations, capabilities, processes, and relationships. The database of record is logical replica capable of multi-layer traffic delivery emulation down to the wavelength, packet, queue, Class of Service (COS), emission, backplane, etc. The database of record is a logical replica in a sufficiently complete implementation for designing and testing new control mechanisms, for product designs, for product testing as a testbed for new service testing and deployment, to stress-test the network for processing-intensive network control and management strategies, for network growth planning and the like. The systems and methods include intelligent information collection and modeling based on active applications, to minimize communication between the replica and the network.

SDN Network

Figure 1:
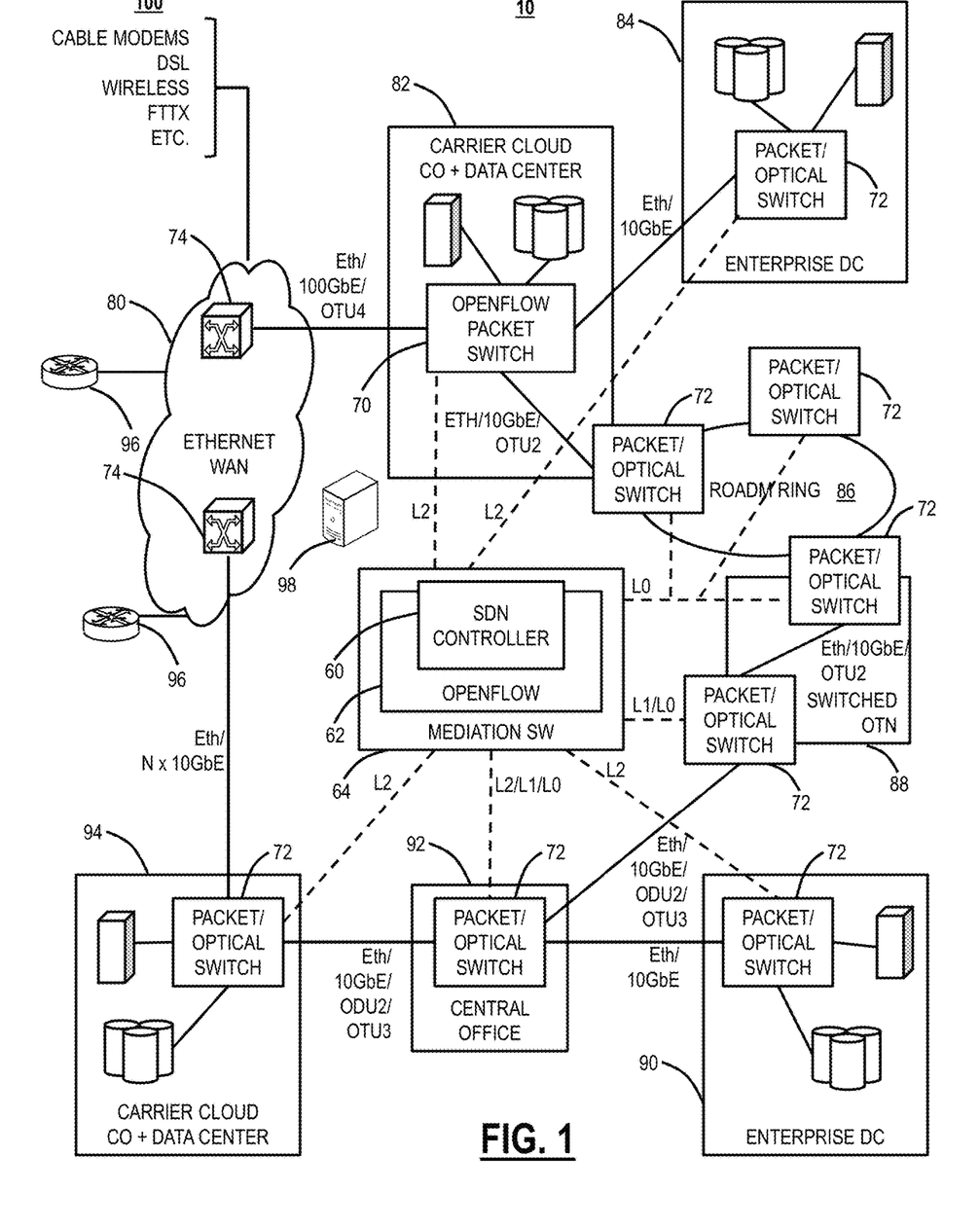
FIG. 1 is a network diagram of an SDN network for describing the systems and methods proposed herein.

FIG. 1 is a network diagram of an SDN network 10 for describing the systems and methods proposed herein. Those of ordinary skill in the art will recognize that various network configurations are contemplated with the proposed systems and methods, and the network 10 is merely presented for illustration. The network 10 is an SDN network, which includes an SDN controller (or orchestrator) 60 with the ability to (logically) centrally program provisioning of forwarding in the network 10 in order for more flexible and precise control over network resources to support new services. Application Programmable Interfaces (APIs) provide programmatic communication between an SDN controller and either (i) specific applications or (ii) programmable network devices such as communication over Transaction Language-1 (TL-1) or Common Object Request Broker Architecture (CORBA) calls. OpenFlow (www.openflow.org) is an example implementation of a special OpenFlow interface 62 from the SDN controller 60 to programmable network devices. The SDN controller 60 may or may not communicate via mediation software 64, to each switch 70, 72, 74 in the network 10 in order to provision a forwarding table at each switch along a connection path in order to instantiate the forwarding behavior needed for the connection. OpenFlow is described, for example, in the OpenFlow Switch Speciation, Version 1.1.0 (February 2011)—Version 1.5.0 (December 2014), the contents of which are incorporated by reference herein. While OpenFlow describes one version of an SDN interface, other SDN protocols besides OpenFlow (such as Netconf, REST, CLI, etc.) are also contemplated for use with the systems and methods described herein.

Again, for illustration purposes, the network 10 includes an OpenFlow-controlled packet switch 70, various packet/optical switches 72, and packet switches 74 with the switches 70, 72 each communicatively coupled to the SDN controller 60 via the OpenFlow interface 62 and the mediation software 64 at any of Layers 0-3 (for example L0 being DWDM, L1 being OTN, L2 being Ethernet, L3 being Internet Protocol, etc.). The switches 70, 72, 74, again for illustration purposes only, are located at various sites, including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. The network 10 can also include IP routers 96 and a network management system (NMS) 98. Note, there can be more than one of the NMS 98, e.g., an NMS for each type of equipment—communicatively coupled to the SDN controller 60. Again, the network 10 is shown just to provide context and typical configurations at Layers 0-3 in an SDN network for illustration purposes. Those of ordinary skill in the art will recognize various other network configurations are possible at Layers 0-3 in the SDN network.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-3 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., at Layer 2, the packet/optical switches 72 can provide Ethernet or Multi-Protocol Label Switching (MPLS) packet switching and at Layer 3 the packet/optical switches can provide IP packet forwarding. The packet switches 74 can be traditional Ethernet switches that are not controlled by the SDN controller 60 or Ethernet switches controlled by the SDN controller 60. The network 10 can include various access technologies 100, such as, without limitation, cable modems, digital subscriber loop (DSL), wireless (e.g., 5G), fiber-to-the-X (e.g., home, premises, curb, etc.), and the like. In an embodiment of the proposed solution, the network 10 is a multi-vendor (i.e., different vendors for the various components) and multi-layer network (i.e., Layers L0-L3).

Figure 2:
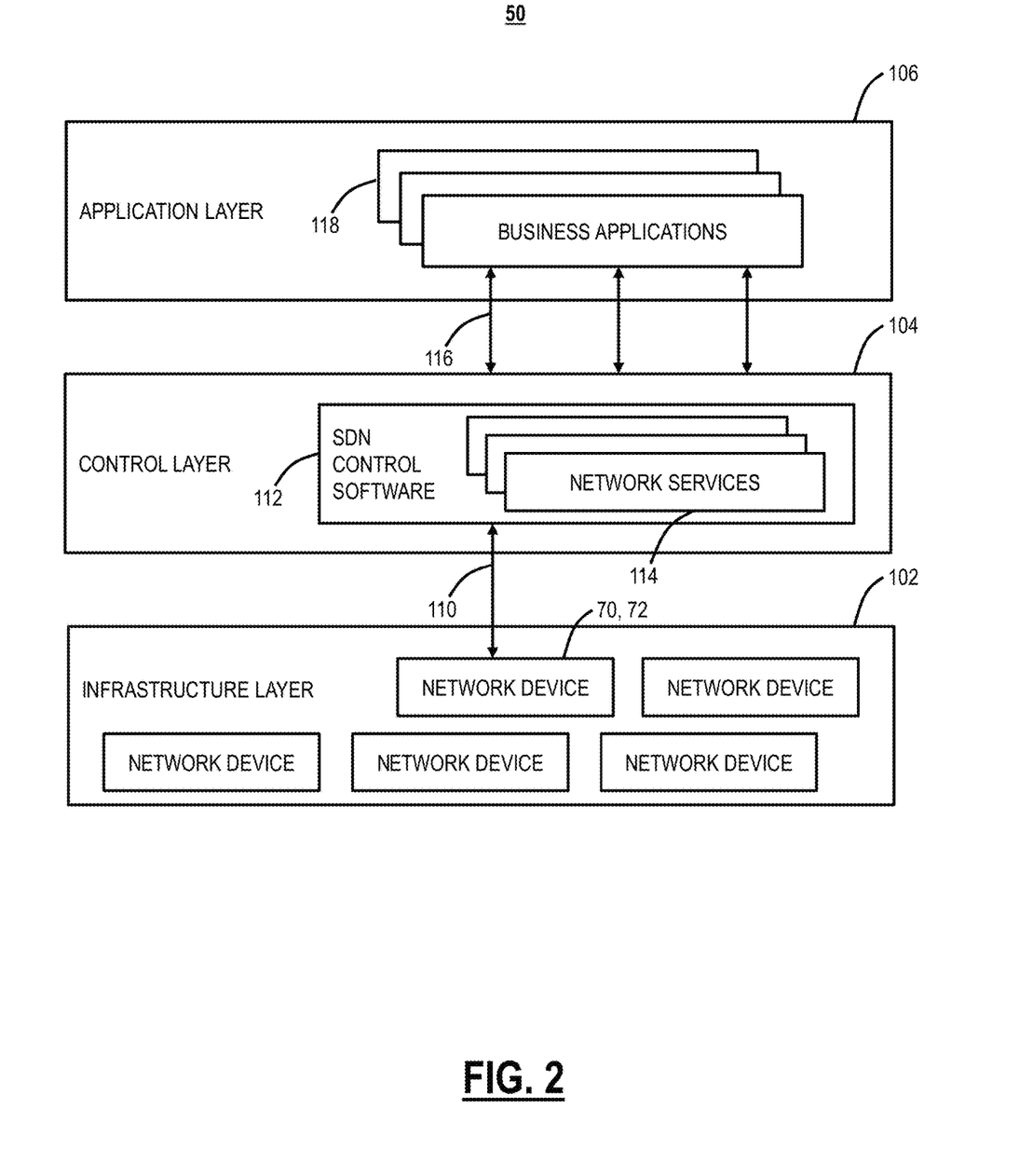
FIG. 2 is a block diagram of functional components of an SDN environment.
Figure 3:
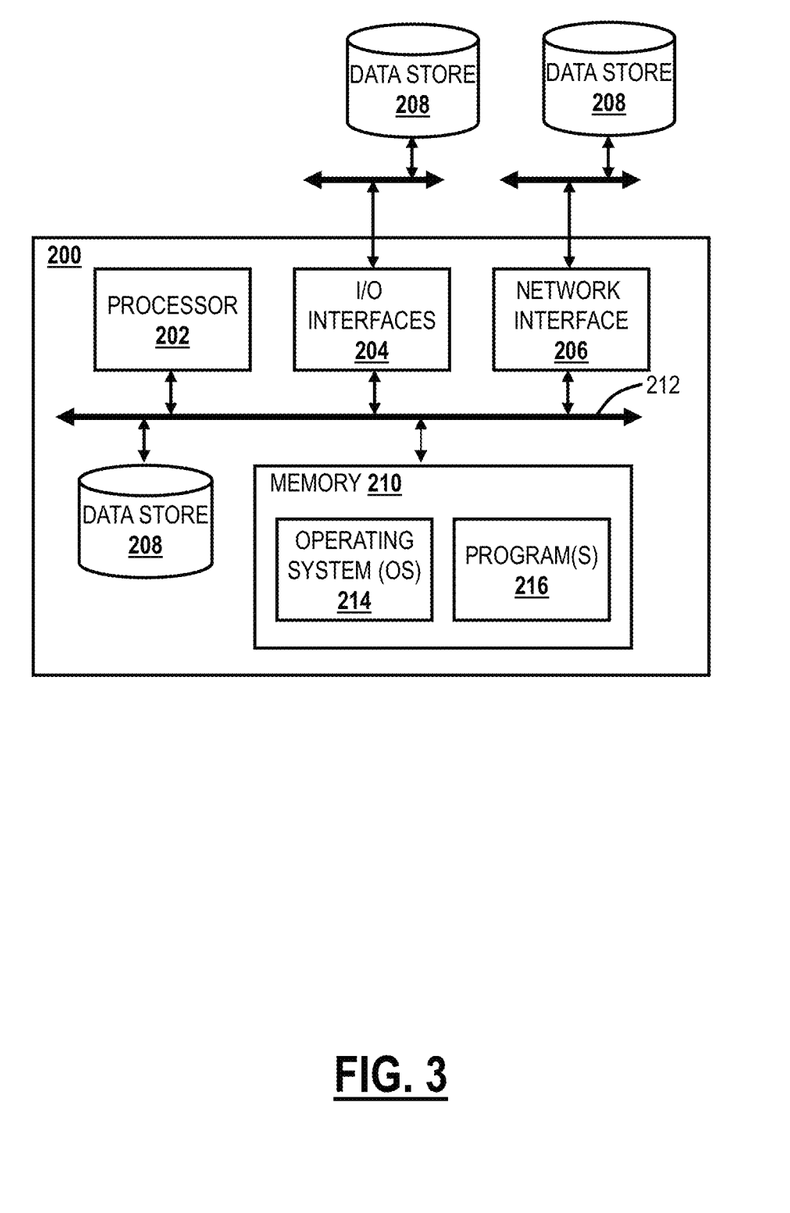
FIG. 3 is a block diagram illustrating a server which may be used to realize the SDN controller, the business applications, and/or other systems.

FIG. 2 is a block diagram of functional components of an SDN environment 50. The SDN environment layers 104, 106 can be implemented on one or more servers, such as illustrated in FIG. 3 and the layers 104, 106 can be provided through functional components implemented in software executed on the server. The SDN environment 50 includes a programmable infrastructure layer 102, a control layer 104, and an application layer 106. The programmable infrastructure layer 102 includes network devices such as the switches 70, 72 and the like. The programmable infrastructure layer 102 is communicatively coupled to the control layer 104 via a control plane interface 110 such as OpenFlow, for example. The control layer 104 facilitates communication between the application layer 106 and the network devices 70, 72 located in the programmable infrastructure layer 102. The control layer 104 includes SDN control software 112 with a plurality of network services 114. The control layer 104 provides SDN functionality to manage network services 114 through abstraction of lower level functionality. The application layer 106 communicates with the control layer 104 through various Application Programming Interfaces (APIs) 116. The application layer 106 provides end user connectivity to the SDN such as software modules and/or functions responsible for creating a desired path and flow connections on the physical network through various business applications 118. In an embodiment of the proposed solution, the systems and methods described herein are implemented as one of the business applications 118 on the SDN controller 60 and/or on a separate server 200.

Server

FIG. 3 is a block diagram illustrating a server 200 which may be used to realize the SDN controller 60, the business applications 118, and/or other systems. The server 200 may be a (special purpose) digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown).

The network interface 206 may be used to enable the server 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Note, the server 200 describes a physical implementation of a device for realizing the systems and methods. Additionally, the systems and methods can be implemented via Virtual Machines (VMs), software containers, etc.

Database of Record

Again, for network automation, a database of record is presented that interacts in real time with managed entities in the network 10, i.e., services, network managed entities, applications, functions, and storage, compute, physical, and human resources (or some subset) and their associated data of relevance in real time (each will be referred to as a managed entity for the remainder of this document). The database of record can also be associated with a set of assertions which may be static, dynamic, Boolean or relatively conditional, etc. that outline the true nature of how managed entities are related to each other and of the capabilities and limitations of such a managed entity. These assertions may be sourced from physics (e.g., similar to developing a physics engine with location, vector, power, space, mobility attributes), definition (e.g., the definition of a particular service will identify a set of locations/addresses, requirements, and functions required or physical device with a prescribed software version's capabilities), interface capabilities (e.g., API definitions), processes (e.g., human workload management, job control, network change management), architectures (e.g., client/slave, peer to peer, hierarchical, etc.), policies (e.g., priorities), ownership, algorithms, business relationships, etc. sufficient to accurately model the network and its environment accurately. In an embodiment, Artificial Intelligence (AI) based mechanisms like reinforcement learing, analytics, or programming can be used to extrapolate data, develop processes, architectures, policy, etc., using the logical database of record.

The logical database of record allows the state of the real network to be observed or inferred and controlled by automated processes that take actions to affect its future state through available API's. In its ultimate state, the above logical network and environment replica in the logical database of record is capable of fully representing the physical network 10 and its environment with sufficient statistical relevance to optimize, alter, test, plan, and predict with results sufficiently similar to the corresponding action on the real network 10. Further, this logical network and environment replica can have APIs that enable applications to optimize, control, configure, plan, manage, service or product design and test, or change based on all or a subcomponent of the network replica and to fully or partially statically (i.e., fork) or dynamically (i.e., parallel) replicate the replica for a given application or set of applications prior to changing the actual network 10.

This logical network and environment replica, i.e., the logical database of record, is able to access the network 10 and its environment through APIs that extend into analytics, hypervisors, Operating Systems (OSs), Network Functions Virtualization Orchestrators (NFVOs), Multi-Domain Service Orchestrators (MDSOs), SDN controllers, user interfaces, applications, element management, network management, the Operation Support System (OSS), the Business Support System (BSS), and/or resource adaptors to pull data from the network 10 and to effect change in the real network and its environment. In addition, APIs and analytics can derive the assertions from service provider policies, processes, vendor configurations or specifications, and any other sources of data relevant to the assertions.

In its preferred state, the database of record is implemented in a highly efficient manner reducing the distribution of irrelevant data, minimizing the resource consumption for network 10 to provide replica data, and to minimize change execution from replica to network 10. Note that measurements taken that are not relevant to the replica may be leveraged or archived by other systems. The replica may choose to utilize these records if in the future an application was added that could leverage the historical information.

Given the network 10 can be highly distributed, so can the replica. The ultimate instantiation of this replica can be micro or atomically serviced, based in a distributed cloud infrastructure that closely maps to the network's physical location while supporting business continuity by ensuring replica data replication. Templates could be used to describe and define services and relationships. Further, the replica can enable analytics and machine learning to monitor replica state, accuracy, errors, assertion inconsistencies, identify data relevance and refresh frequency, etc.

Figure 4:
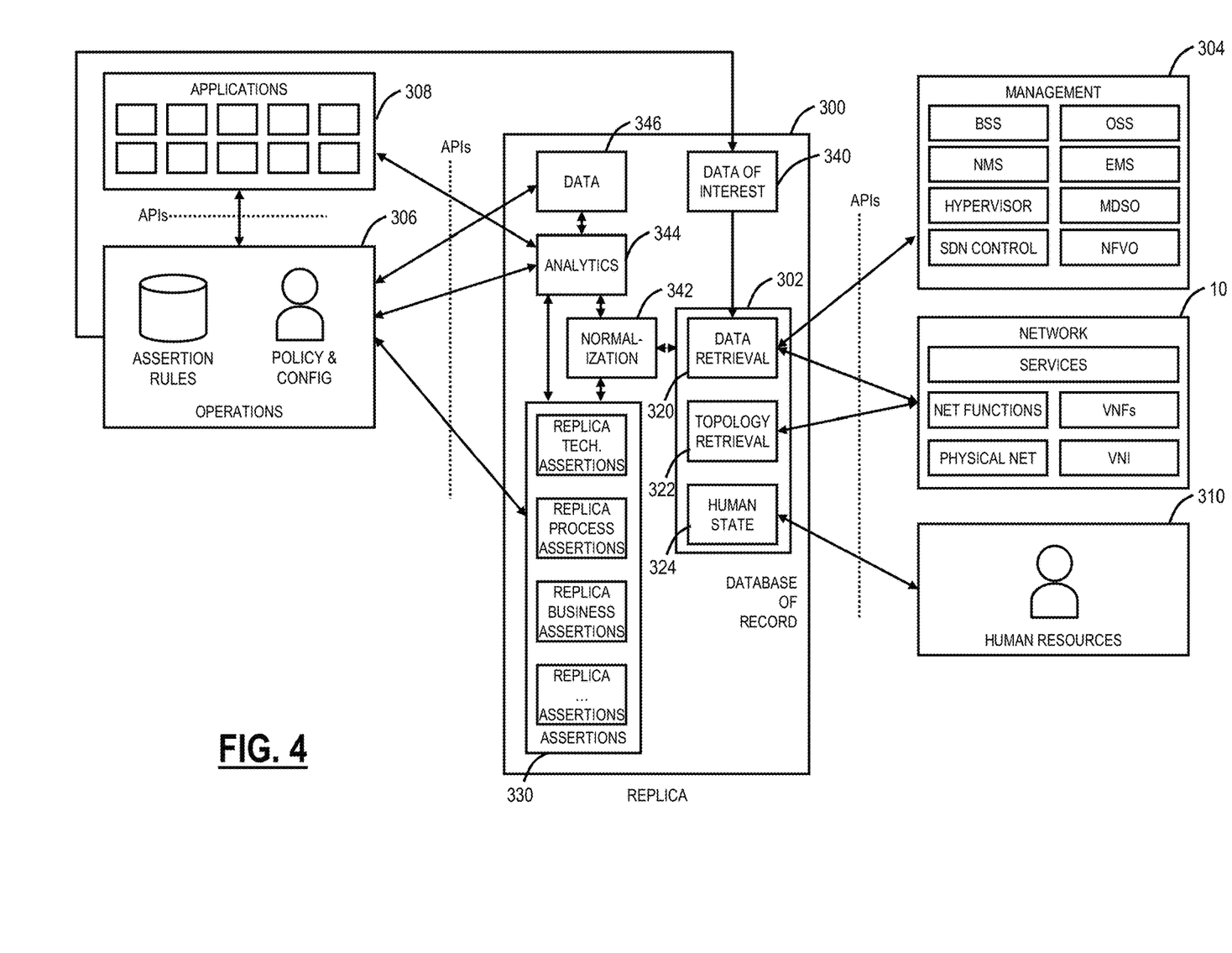
FIG. 4 is a block diagram of a network replica including a database of record interfacing with the network of FIG. 1, management systems, operations, applications, and human resources.

FIG. 4 is a block diagram of a network replica 300 including a database of record 302 interfacing with the network 10, management systems 304, operations 306, applications 308, and human resources 310. The network replica 300 is derived based on interactions with the applications 308 built to work with the network replica 300, the network 10, operations 306, and an understanding of the human resources 310 involved in its processes. The network replica 300 is a computer-implemented/executed system and contemplates operation on the server 200, on a group of servers 200, in the cloud, etc. The network replica 300 can utilize any computing architecture including microservices, containers, etc.

The management systems 304 contemplate various types of management systems including, without limitation, BSSs, Network Management Systems (NMS), hypervisors, SDN control, OSSs, Element Management Systems (EMS), MDSO, NFVO, etc. The network 10 can include various services implemented in the network 10, network functions, physical network elements, Virtual Network Functions (VNFs), Virtual Network Infrastructure (VNI), etc. The operations 306 are operators interacting with the network replica 300 and can include assertion rules, policy, state machines, and configuration, etc. The operations 306 can be configured to interact and perform various functions described herein with the network replica 300 via applications 308.

The network replica 300 includes the database of record 302 which includes a data retrieval module 320, a topology retrieval module 322, and a human state module 324. The data retrieval module 320 can obtain data from the network 10, e.g., Performance Monitoring (PM), Operations, Administration, Maintenance, and Provisioning (OAM&P) data, configuration data, etc. The topology retrieval module 322 can obtain network topology, service configuration, etc. of the network 10. The human state module 324 can obtain human workload management, job control, network change management, etc. The network replica 300 further includes assertions 330 such as replica technology assertions, replica process assertions, replica business assertions, and the like. The network replica 300 interacts with the network 10, the management systems 304, the operations 306, the applications 308, and the human resources 310 via various APIs.

The network replica 300 itself has components that provide the following capabilities including tracking via a data of interest 340 module, the database of record 302, the assertions 330 that provide understanding on the functional capabilities and limitations of the each component in the replica 300, normalization 342 capabilities that translate elements in the database of record 302 to a common normalized definition and timeframe—recognizing that data collected from the operations 306, the human resources 310, and the network 10 may be collected at different frequencies and times and may hold off-standard definitions. The network replica 300 also includes an analytics engine 344 that leverage the database of record 302 (typically post-normalization) along with the assertions 330 to deliver processed data to the applications 308 and the operations 306. Note that the analytics engine 344 can gain access to additional sources of information through other connections (e.g., Twitter feeds to determine world events, APIs to external data sources, etc.). Both processed and normalized raw data are made available to the applications 308 and the operations 306 through a data module 346.

The data of interest 340 module provides interaction between the applications 308, the network replica 300, and the operations 306 as well as via configuration to determine what data is relevant to the current deployment of the network replica 300. Changes in interest can cause churn in and out of various managed entities in the model with a cache model to add managed entities to the model immediately upon discovering the need, but removal after a period of minimal interest unless highlighted by the operations 306 or an application 308 as an important but rarely used managed entities.

Figure 5:
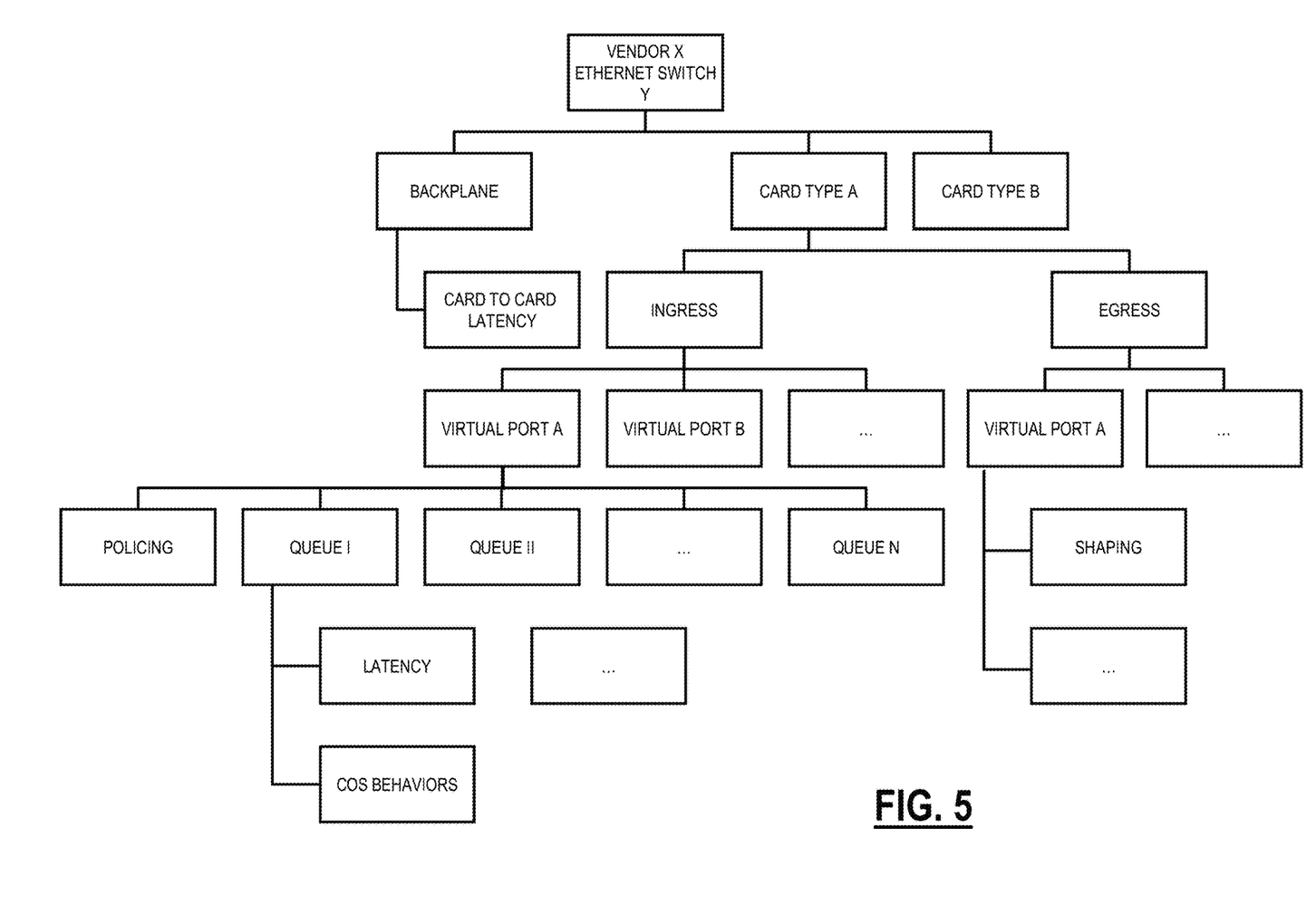
FIG. 5 is a diagram of information in the database of record illustrating an example of the level of detail when running applications that simulate traffic on the network of FIG. 1.

FIG. 5 is a diagram of information in the database of record 302 illustrating an example of the level of detail when running applications that simulate traffic on the network 10. In this example, a vendor X Ethernet switch Y is modeled with a backplane, and associated card-to-card latency and various card types A, B, etc. The card type A can have information related to ingress with virtual ports, policing, queues I, II, N, etc. The queues can have information for modeling latency, Class of Service (COS) behavior, etc. The egress for the card type A can have a virtual port with shaping, etc.

The network replica 300 itself is generated from a combination of existing network management, SDN, NFV, network discovery, probing, configuration, and vendor specifications on the characteristics of each component of the network 10.

Instrumentation of the network replica 300 occurs through resource adaptation that accesses equipment through management ports and could also include the use of network probes, endpoint performance measurement, network taps, or passive network interfaces. Management, orchestration, and other control systems may also be used for instrumentation where the latency is acceptable and noting that many of these systems may ultimately reside as applications that rely on the network replica 300 for data.

The assertions 330 are data structures, rules, etc. that provide the ability to understand how components of the network 10 and its environment act under different configuration and performance characteristics. As such, the assertions 330 can include data structures, algorithms, conditions/thresholds, state machines, and procedural calls. The assertions 330 can be generated based on reinforcement learning, analytics, programming, etc.

The normalization 342 capture standard definitions of data and a defined data frequency and adapts information collected by the database of record 302 to the requisite definitions and data frequency through embedded and/or configurable algorithms and timelines.

The analytics engine 344 can be provided by the applications 308 or be a common analytic capability used by a number of applications 308. For example, the analytics engine 344 could identify whether the network 10 was in an anomalous state and degree of distress it was under by comparing the normalized database of record 302 with typical past network state including current and historical operator. Quality of Experience (QoE) information can be pulled from an operational database.

Figure 6:
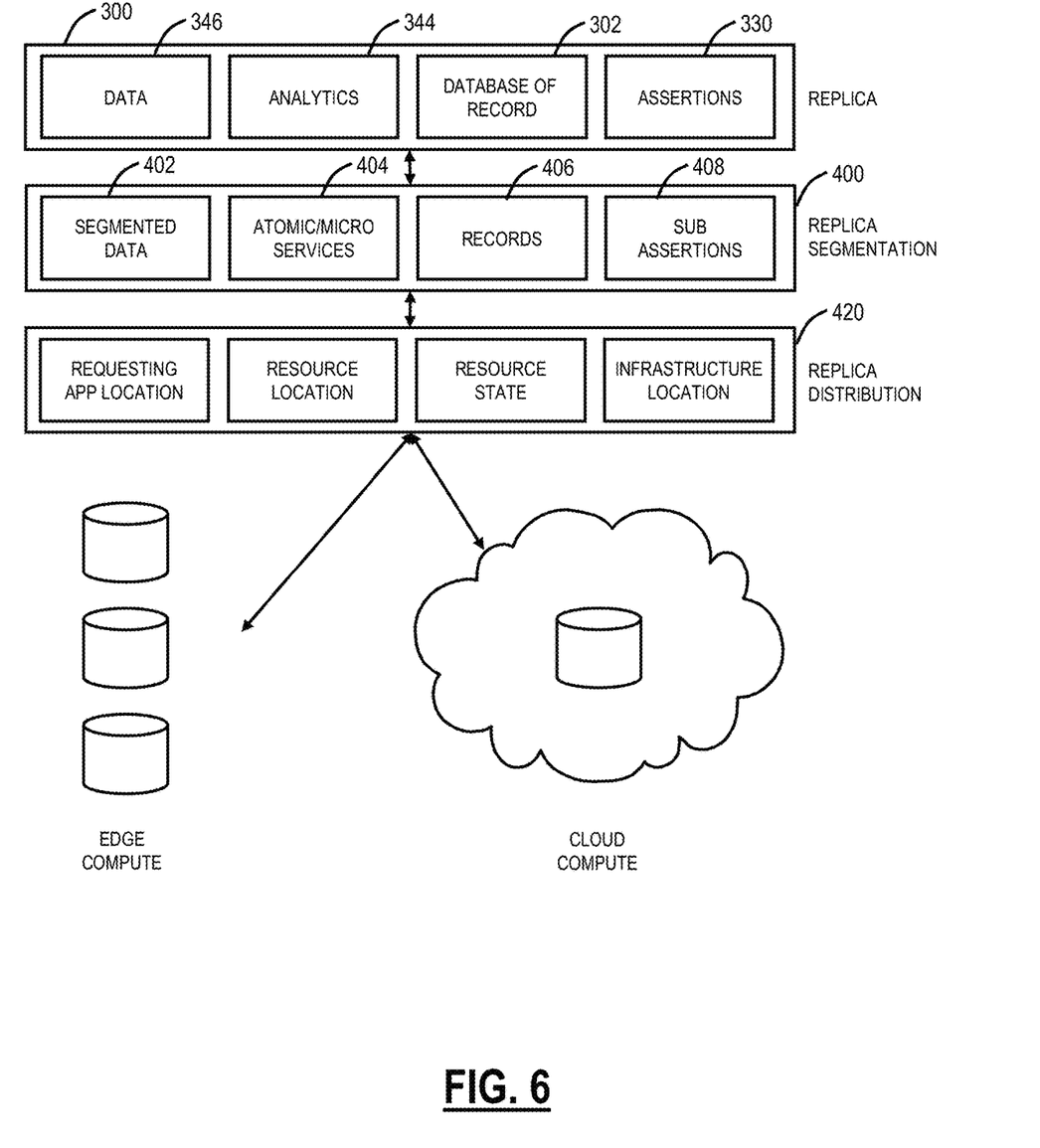
FIG. 6 is a diagram of segmentation of the network replica of FIG. 4.

FIG. 6 is a diagram of segmentation of the network replica 300. Another component of the network replica 300 is its ability to employ the data of interest 340 module as well as the database of record 302 to capture the logical and physical locations of the network 10, its environment, application execution, and operations request sources. This location information could be through Internet Protocol (IP) addressing or Global Positioning Satellite (GPS) coordinates. This allows the network replica 300 to segment itself through replica segmentation 400 into subcomponents including segmented data 402, atomic/micro-services 404, records 406, and sub-assertions 408 and to be distributed through replica distribution 420 within a distributed cloud infrastructure to both edge and core cloud compute components. Typically, this involves moving data storage closer to the equipment and performing analytics specific to local equipment locally.

Use Cases

The network replica 300, having a real-time or near real-time view of the network 10, can enable various use cases. The network replica 300 is a detailed model of the current state of the twinned "real" network 10 allowing the state of the real network to be observed or inferred and controlled by automated processes that take actions to affect its future state through available API's.

The network replica 300 can be a platform for designing and testing new control mechanisms. The availability of state information and measurements from the real network in the network replica 300 allows new control mechanisms to be designed and tested in a safe way, first applied to control the network replica 300, and later, after testing, applied to control the real network 10. The control mechanisms could be simple automation of existing human processes, or they could be based on sophisticated control theory or machine learning algorithms.

The network replica 300 can be a testbed for product and service designs. Before a product/service is developed, a "representation" of it could be and incorporated into the network replica 300. The representation could have a specified external behavior (how it interacts with the rest of the network replica 300) preferably with a very lightweight implementation. This allows the benefits/limitations of a product/service design to be evaluated quickly and at low cost. The network replica 300 can be a testbed for new service design. Similar to a testbed for product designs, except that most of the design includes coordinating and controlling existing network elements to produce new network behavior (such as automation of existing network management processes like ordering services). The network replica 300 can be a testbed for product testing. The APIs in the network replica 300 could be associated with a newly developed product allowing that product to be "driven" by the network replica 300 to evaluate its performance in a safe environment.

The network replica 300 can be a testbed for new service testing and deployment. Once a new service has been designed, it could be deployed within the network replica 300 to allow its functionality and reliability to be tested. This allows operators to access the service through the available APIs so that the service could be test-driven and evaluated in a safe way. If high volume/high performance is needed, the service could be deployed "outside" the network replica 300 in the real network allowing greater scale and performance testing, or it could be put into limited production within the replica while providing a real external service.

The network replica 300 can provide a safe way to stress-test the real network 10. Network failures, including those induced by man-made or natural events could be safely simulated in the network replica 300 to assess their impact. This allows defensive measures to be designed and tested without affecting the real network 10. These defensive measures could themselves use the automation and control capabilities of the replica as the foundation for the implementation of stress response mechanisms.

The network replica 300 can provide a platform for processing-intensive network control and management strategies. An example of this is periodic network grooming— the connection state of the existing network could be evaluated, and critical connections could be moved to other routes thereby reclaiming stranded or wasted bandwidth and prolonging the life of the network. These computations could all be done within the network replica 300 and then automatically implemented within the real network once a suitable set of configurations has been selected.

The network replica 300 can provide a platform for network planning. The design limits of the current real network could be evaluated using simulated traffic growth within the replica. Traffic growth scenarios could be simulated to evaluate the quality of network growth proposals before they are presented to operators.

Network Replica Process

Figure 7:
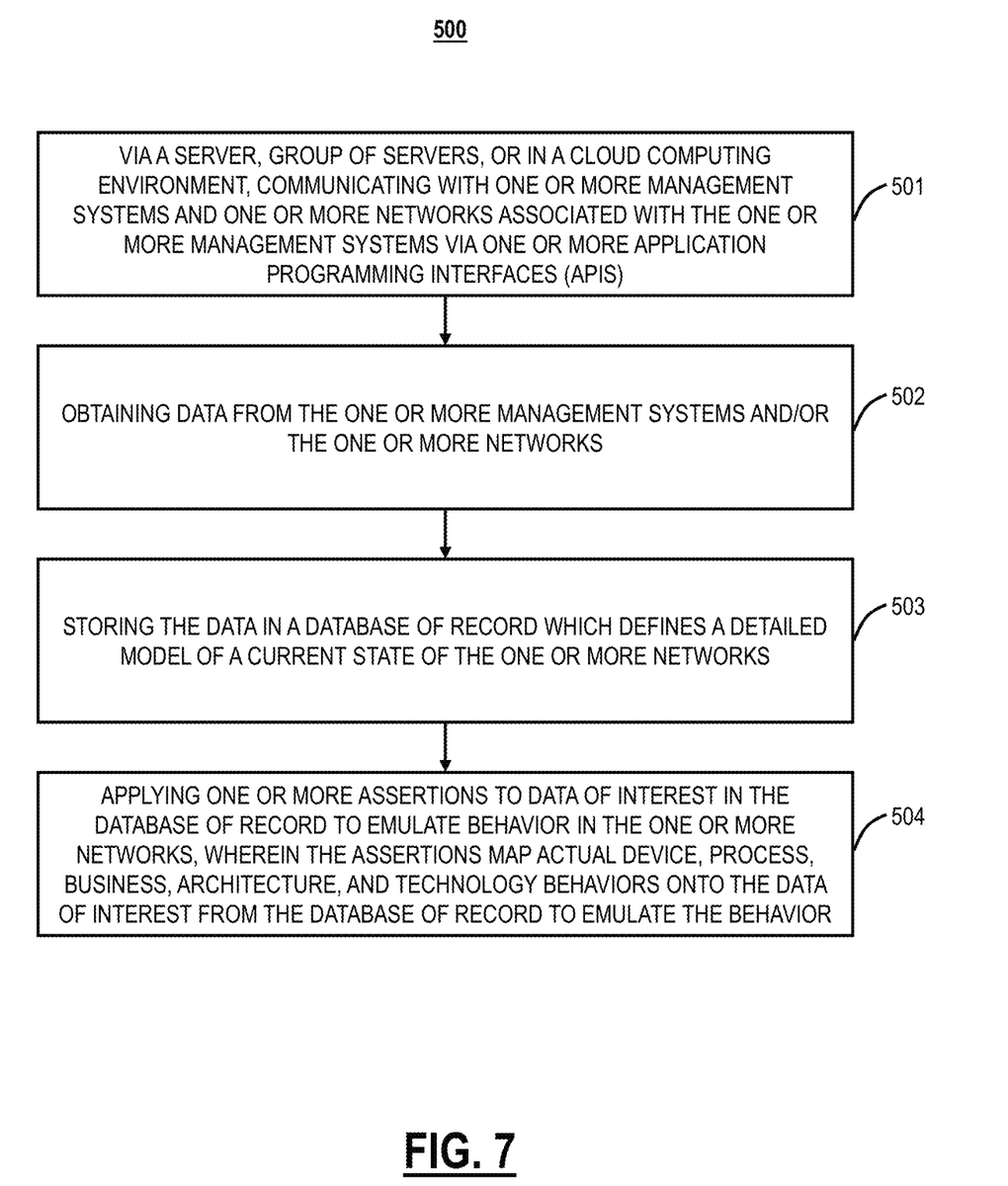
FIG. 7 is a flowchart of a network replication process.

FIG. 7 is a flowchart of a network replication process 500. The network replica process 500 includes, via a server, group of servers, or in a cloud computing environment, communicating with one or more management systems and one or more networks associated with the one or more management systems via one or more Application Programming Interfaces (APIs) (step 501); obtaining data from the one or more management systems and/or the one or more networks (step 502); storing the data in a database of record which defines a detailed model of a current state of the one or more networks (step 503); and applying one or more assertions to data of interest in the database of record to emulate behavior in the one or more networks, wherein the assertions map actual device, process, business, architecture, and technology behaviors onto the data of interest from the database of record to emulate the behavior (step 504), wherein the database of record and the applied one or more assertions include a network replica of the one or more networks.

The one or more assertions model functional capabilities and limitations of components in the one or more networks. The network replica process 500 can further include normalizing the obtained data to a common normalized definition and timeframe prior to the storing. The one or management systems can include any of a hypervisor, a Network Functions Virtualization Orchestrator (NFVO), a Multi-Domain Service Orchestrator (MDSO), a Software Defined Networking (SDN) controller, an Element Management System (EMS), a Network Management System (NMS), an Operation Support System (OSS), and a Business Support System (BSS).

The network replica process 500 can further include analyzing the stored data via an analytics engine to detect whether the one or more networks are in an anomalous state and if so, to identify a degree of distress based on past network states from the database of record. The network replica process 500 can further include segmenting the network replica into subcomponents; and distributing the subcomponents of the network replica to the edge and core cloud compute components for analyzing local equipment. The one or more assertions can emulate traffic on the one or more networks at any of a photonic layer, a Time Division Multiplexing (TDM) layer, a packet layer, and a combination thereof. The network replica process 500 can further include analyzing the obtained data to determine relevance of the obtained data prior to the storing.

In another embodiment, a system includes one or more network interfaces communicatively coupled to one or more management systems and one or more networks associated with the one or more management systems via one or more Application Programming Interfaces (APIs); one or more processors communicatively coupled to the one or more network interfaces; and memory storing instructions that, when executed, cause the one or more processors to obtain data from the one or more management systems and/or the one or more networks, store the data in a database of record which defines a detailed model of a current state of the one or more networks, and apply one or more assertions to data of interest in the database of record to emulate behavior in the one or more networks, wherein the assertions map actual device, process, business, architecture, and technology behaviors onto the data of interest from the database of record to emulate the behavior, wherein the database of record and the applied one or more assertions include a network replica of the one or more networks.

In a further embodiment, a non-transitory computer-readable medium including instructions that, when executed, cause a server, group of servers, or a cloud computing environment to perform the steps of: communicating with one or more management systems and one or more networks associated with the one or more management systems via one or more Application Programming Interfaces (APIs); obtaining data from the one or more management systems and/or the one or more networks; storing the data in a database of record which defines a detailed model of a current state of the one or more networks; and applying one or more assertions to data of interest in the database of record to emulate behavior in the one or more networks, wherein the assertions map actual device, process, business, architecture, and technology behaviors onto the data of interest from the database of record to emulate the behavior, wherein the database of record and the applied one or more assertions include a network replica of the one or more networks.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network replica method comprising:
   via a server, a group of servers, or in a cloud computing environment, communicating with one or more management systems and one or more networks associated with the one or more management systems via one or more Application Programming Interfaces (APIs);
   obtaining data from any of the one or more management systems and the one or more networks for a database of record, the data obtained for the database of record including one or more of Performance Monitoring (PM), Operations, Administration, Maintenance, and Provisioning (OAM&P) data, configuration data, network topoloy data, service configuration data, human workload management data, job control data, and network change management data;
   storing the data in the database of record which defines a detailed model of a current state of the one or more networks; and
   applying one or more assertions to data of interest in the database of record to emulate behavior in the one or more networks, wherein the assertions map one or more of actual device, process, business, architecture, and technology behaviors onto the data of interest from the database of record to emulate the behavior,
   wherein the database of record and the applied one or more assertions comprise a network replica of the one or more networks.

2. The network replica method of claim 1, wherein the one or more assertions model functional capabilities and limitations of components in the one or more networks.

3. The network replica method of claim 1, further comprising:
   normalizing the obtained data to a common normalized definition and timeframe prior to the storing.

4. The network replica method of claim 1, wherein the one or management systems comprise any of a hypervisor, a Network Functions Virtualization Orchestrator (NFVO), a Multi-Domain Service Orchestrator (MDSO), a Software Defined Networking (SDN) controller, an Element Management System (EMS), a Network Management System (NMS), an Operation Support System (OSS), and a Business Support System (BSS).

5. The network replica method of claim 1, further comprising:
   analyzing the stored data via an analytics engine to detect whether the one or more networks are in an anomalous state and, if so, to identify a degree of distress based on past network states from the database of record.

6. The network replica method of claim 1, further comprising:
   segmenting the network replica into subcomponents; and
   distributing the subcomponents of the network replica to edge and core cloud compute components for analyzing local equipment.

7. The network replica method of claim 1, wherein the one or more assertions emulate traffic on the one or more networks at any of a photonic layer, a Time Division Multiplexing (TDM) layer, a packet layer, and a combination thereof.

8. The network replica method of claim 1, further comprising:
   analyzing the obtained data to determine relevance of the obtained data prior to the storing.

9. A system comprising:
   one or more network interfaces communicatively coupled to one or more management systems and one or more networks associated with the one or more management systems via one or more Application Programming Interfaces (APIs);
   one or more processors communicatively coupled to the one or more network interfaces; and
   memory storing instructions that, when executed, cause the one or more processors to
      obtain data from any of the one or more management systems and the one or more networks for a database of record, the data obtained for the database of record including one or more of Performance Monitoring (PM), Operations, Administration, Maintenance, and Provisioning (OAM&P) data, configuration data, network topology data, service configuration data, human workload management data, job control data, and network change management data,
      store the data in the database of record which defines a detailed model of a current state of the one or more networks, and
      apply one or more assertions to data of interest in the database of record to emulate behavior in the one or more networks, wherein the assertions map one or more of actual device, process, business, architecture, and technology behaviors onto the data of interest from the database of record to emulate the behavior,
   wherein the database of record and the applied one or more assertions comprise a network replica of the one or more networks.

10. The system of claim 9, wherein the one or more assertions model functional capabilities and limitations of components in the one or more networks.

11. The system of claim 9, wherein the instructions that, when executed, further cause the one or more processors to normalize the obtained data to a common normalized definition and timeframe prior to storage.

12. The system of claim 9, wherein the one or management systems comprise any of a hypervisor, a Network Functions Virtualization Orchestrator (NFVO), a Multi-Domain Service Orchestrator (MDSO), a Software Defined Networking (SDN) controller, an Element Management System (EMS), a Network Management System (NMS), an Operation Support System (OSS), and a Business Support System (BSS).

13. The system of claim 9, wherein the instructions that, when executed, further cause the one or more processors to
analyze the stored data via an analytics engine to detect whether the one or more networks are in an anomalous state and if so, to identify a degree of distress based on past network states from the database of record.

14. The system of claim 9, wherein the instructions that, when executed, further cause the one or more processors to
segment the network replica into subcomponents, and
distribute the subcomponents of the network replica to edge and core cloud compute components for analyzing local equipment.

15. The system of claim 9, wherein the one or more assertions emulate traffic on the one or more networks at any of a photonic layer, a Time Division Multiplexing (TDM) layer, a packet layer, and a combination thereof.

16. The system of claim 9, wherein the instructions that, when executed, further cause the one or more processors to
analyze the obtained data to determine relevance of the obtained data prior to storage.

17. A non-transitory computer-readable medium comprising instructions that, when executed, cause a server, group of servers, or a cloud computing environment to perform the steps of:
communicating with one or more management systems and one or more networks associated with the one or more management systems via one or more Application Programming Interfaces (APIs);
obtaining data from any of the one or more management systems and the one or more networks for a database of record, the data obtained for the database of record including one or more of Performance Monitoring (PM), Operations, Administration, Maintenance, and Provisioning (OAM&P) data, configuration data, network topology data, service configuration data, human workload management data, job control data, and network change management data;
storing the data in the database of record which defines a detailed model of a current state of the one or more networks; and
applying one or more assertions to data of interest in the database of record to emulate behavior in the one or more networks, wherein the assertions map one or more of actual device, process, business, architecture, and technology behaviors onto the data of interest from the database of record to emulate the behavior,
wherein the database of record and the applied one or more assertions comprise a network replica of the one or more networks.

18. The non-transitory computer-readable medium of claim 17, wherein the one or more assertions model functional capabilities and limitations of components in the one or more networks.

19. The non-transitory computer-readable medium of claim 17, wherein steps further comprise:
normalizing the obtained data to a common normalized definition and timeframe prior to the storing.

20. The non-transitory computer-readable medium of claim 17, wherein the one or management systems comprise any of a hypervisor, a Network Functions Virtualization Orchestrator (NFVO), a Multi-Domain Service Orchestrator (MDSO), a Software Defined Networking (SDN) controller, an Element Management System (EMS), a Network Management System (NMS), an Operation Support System (OSS), and a Business Support System (BSS).

* * * * *